(12) United States Patent
Nurmela et al.

(10) Patent No.: US 8,111,193 B2
(45) Date of Patent: Feb. 7, 2012

(54) DISTANCE ESTIMATION (75) Inventors: Vuokko Nurmela, Espoo (FI); Kimmo Kalliola, Helsinki (FI); Antti P. Kainulainen, Espoo (FI); Joni Jantunen, Helsinki (FI)

(73) Assignee: Nokia Corporation, Espoo (FI)

( * ) Notice: Subject to any disclaimer, the term of this patent is extended or adjusted under 35 U.S.C. 154(b) by 166 days.

(21) Appl. No.: 12/521,751

(22) PCT Filed: Nov. 15, 2007

(86) PCT No.: PCT/EP2007/009940
§ 371 (c)(1),
(2), (4) Date: Jun. 29, 2009

(87) PCT Pub. No.: WO2008/080450
PCT Pub. Date: Jul. 10, 2008

(65) Prior Publication Data
US 2010/0315289 A1    Dec. 16, 2010

(30) Foreign Application Priority Data
Dec. 29, 2006    (GB) .................................. 0625996.4

(51) Int. Cl.
*G01S 3/02*    (2006.01)
(52) U.S. Cl. ....................................................... 342/458
(58) Field of Classification Search .................... 342/458
See application file for complete search history.

(56) References Cited

U.S. PATENT DOCUMENTS

| 4,584,582 | A | | 4/1986 | Munger | |
|---|---|---|---|---|---|
| 5,974,329 | A | * | 10/1999 | Wylie et al. | 455/456.1 |
| 7,203,501 | B2 | * | 4/2007 | Kim et al. | 455/456.1 |
| 2005/0069065 | A1 | | 3/2005 | Oh et al. | |
| 2005/0124368 | A1 | * | 6/2005 | Diao et al. | 455/522 |
| 2006/0012523 | A1 | * | 1/2006 | Schmid et al. | 342/451 |
| 2008/0247450 | A1 | * | 10/2008 | Alexander et al. | 375/224 |

FOREIGN PATENT DOCUMENTS
WO    WO-98/14018    4/1998

OTHER PUBLICATIONS

Rapaport, Theodore S. "Wireless communications prinicples and practice",Section 4.9.1 entitled "Log-distance Path Loss Model", 2nd Edition, 2002.*
Great Britain Search Report for Application No. GB0625996.4 dated Apr. 26, 2007.
Nurmela, V., et al. "Additional Information to Invention Report NC53517: Improved Distance Estimation Method Based on Received Signal Power." Nokia Research Center, Sep. 22, 2006.
Patzold, Matthias, "Mobile Fading Channels." John Wiley & Sons, 2002.
Proakis, John G., "Digital Communications," McGraw-Hill, Inc. 1989.
GB Office Action for Patent Application No. GB1110049.2, Jun. 28, 2011.

* cited by examiner

*Primary Examiner* — Thomas Tarcza
*Assistant Examiner* — Frank McGue
(74) *Attorney, Agent, or Firm* — Locke Lord LLP (57) ABSTRACT

The invention relates to an apparatus and method for estimating the distance between a transmitter and a receiver. A method comprising obtaining a signal from a receiver; determining whether the signal more likely propagated through a line-of-sight (LOS) radio channel or a non lme-of-sight (NLOS) radio channel; using a model including parameters selected according to the radio channel to estimate the distance between the receiver and a transmitter which sent the signal.

20 Claims, 4 Drawing Sheets

DISTANCE ESTIMATION

The invention relates to an apparatus and method for estimating the distance between a transmitter and a receiver.

BACKGROUND

In many situations it is important to find a lost object, person or animal. If a small radio-frequency (RF) transmitter is attached to a dog's leash or to a child's clothes or wrist, for example, the signal can be used to find the missing dog or child.

Known methods are available to determine the direction of arrival (DoA) of an incoming signal, and thereby the direction in which the transmitter can be found, and to determine the distance to the transmitter.

Received power can be used to estimate the distance between the transmitter and receiver. A benefit of methods based on received power is that hardware and signal processing requirements are minimised. However, the received power depends on the transmitted power, antenna gains, and the environment through which the signal propagates. Because of the influence of the environment, the relationship between the received power and the distance between transmitter and receiver is not straightforward, such that it is difficult to obtain an accurate estimate. The distance can be estimated most accurately when there is a line-of-sight (LOS) between the transmitter and receiver. In this case, the average received power decreases approximately relative to the distance squared.

Methods based on received power may involve pathloss, which is related to received power after removing fast fading. (Received power is equal to transmitted power, plus path loss, plus slow fading, plus fast fading. Fast fading can be removed rather easily; slow fading is more difficult.)

A commonly-used model for pathloss (PL) is $$PL = -10 \cdot \gamma \cdot \log_{10}(r) + PL_0 \tag{1}$$

where r is the distance between transmitter and receiver, γ is a pathloss exponent, and $PL_0$ is the pathloss at a given distance, for example 1 m.

Utilising this model has some problems caused by propagation distortion. Objects like buildings or walls between the transmitter and receiver attenuate the signal, and this attenuation (shadow fading) does not depend directly on distance.

Other distance-estimation methods use the phase of the received signal or a propagation delay between the transmitter and receiver. However, such methods require very accurate time synchronisation between the transmitter and receiver, which is not feasible with standard hardware. Another distance-estimation method is to have a GPS receiver at each of the transmitter and receiver and a communication method to exchange coordinates.

The listing or discussion of a prior-published document in this specification should not necessarily be taken as an acknowledgement that the document is part of the state of the art or is common general knowledge.

SUMMARY

According to a first aspect of the invention, there is provided a method comprising
 obtaining a signal from a receiver;
 determining whether the signal more likely propagated through a line-of-sight (LOS) radio channel or a non-line-of-sight (NLOS) radio channel;
 using a model including parameters selected according to the radio channel to estimate the distance between the receiver and a transmitter which sent the signal.

The term "obtaining" relates to the acquisition of the signal and/or properties of the signal to the extent that it can be used in the rest of the claimed operations.

By "more likely" is meant that the probability of the signal having propagated through one of an LOS and an NLOS radio channel is higher than the probability of the signal having propagated through the other of an LOS and an NLOS radio channel. In practice, the determination of which path may be made by the setting of thresholds for signal parameters at appropriate points. The thresholds may be set theoretically or empirically.

Determining the radio channel may include identifying characteristics of the received signal and comparing the identified characteristics to characteristics typical of LOS or NLOS signals. The phrase "identifying characteristics" relates to the obtaining of signal parameters.

The characteristics may include any one or more of fading characteristics, power delay profile, Doppler spectrum characteristics, angular power spectrum.

The receiver may comprise a multiantenna receiver. Determining the radio propagation channel may include performing spatial signal processing on the signal obtained from the multiantenna receiver.

Determining the radio propagation channel may include determining antenna power variance, and comparing the determined antenna power variance to an antenna power variance typical of LOS or NLOS signals. Additionally or alternatively, determining the radio channel may include determining an angular power spectrum, and comparing the determined angular power spectrum to an angular power spectrum typical of LOS or NLOS signals.

Determining the radio channel may include identifying fading characteristics of the signal and comparing the fading characteristics to known fading characteristics of LOS and/or NLOS signals.

The method may include determining that the radio propagation channel is more likely to be an NLOS channel than an LOS channel in response to a depth of a fade meeting a predetermined threshold (i.e. deeper fades), or determining that the channel is more likely to be an LOS channel than an NLOS channel in response to a depth of a fade not meeting the predetermined threshold (i.e. shallower fades).

In one embodiment, a threshold is met if a value is equal to or above the threshold, and not met if the value is below the threshold. In another embodiment, a threshold is met if a value is above the threshold, and not met if the value is equal to or below the threshold. In another embodiment, a threshold is met if a value is above the threshold and not met if the value is below the threshold.

The method may include determining that the radio channel is more likely to be an NLOS channel than an LOS channel in response to identifying Rayleigh-type fading characteristics in the signal, or determining that the channel is more likely to be an LOS channel than an NLOS channel in response to identifying Rice-type fading characteristics in the signal.

Determining the radio channel may include determining an angular power spectrum of the signal and comparing the angular power spectrum to known angular power spectrums of LOS and/or NLOS signals.

The method may include calculating a ratio of the values of the highest peak to the second highest peak in the angular power spectrum of the signal, and comparing the ratio to a predetermined threshold.

The method may include determining that the radio channel is more likely to be an LOS channel than an NLOS channel in response to the ratio meeting the predetermined threshold.

The method may include determining that the radio channel is more likely to be an NLOS channel than an LOS channel in response to the ratio not meeting the predetermined threshold.

Determining the radio channel may include determining a power delay profile of the signal and comparing the profile to known power delay profiles of LOS and/or NLOS signals.

The method may include comparing the power level of a first tap to the power levels of other taps in the power delay profile.

The method may include determining that the radio channel is more likely to be an LOS channel than an NLOS channel in response to the first tap having the highest power level.

The method may include determining that the radio channel is more likely to be an NLOS channel than an LOS channel in response to the first tap not having the highest power level.

The method may include comparing the fading characteristics of the first tap to the known fading characteristics of LOS and/or NLOS signals.

The method may include determining that the radio channel is more likely to be an NLOS channel than an LOS channel in response to identifying Rayleigh-type fading characteristics in the first tap.

The method may include determining that the radio channel is more likely to be an LOS channel than an NLOS channel in response to identifying Rice-type fading characteristics in the first tap.

Determining the radio channel may include determining a Doppler spectrum of the signal and comparing the Doppler spectrum to known Doppler spectrums of LOS and/or NLOS signals.

The method may include determining that the radio channel is more likely to be an LOS channel than an NLOS channel in response to detecting a dominant peak in the Doppler spectrum.

The method may include determining that the radio channel is more likely to be an to NLOS channel than an LOS channel in response to detecting the absence of a dominant peak in the Doppler spectrum.

According to a second aspect of the invention, there is provided an apparatus comprising
  a receiver arranged to obtain a signal;
  processing circuitry arranged to determine whether the signal more likely propagated through a line-of-sight (LOS) radio channel or a non-line-of-sight (NLOS) radio channel;
  the processing circuitry being further arranged to use a model including parameters selected according to the radio channel to estimate the distance between the receiver and a transmitter which sent the signal.

The processing circuitry may be arranged to determine the radio channel by identifying characteristics of the received signal and comparing the identified characteristics to characteristics typical of LOS or NLOS signals.

The characteristics may include any one or more of fading characteristics, power delay profile, Doppler spectrum characteristics, angular power spectrum.

The receiver may comprise a multiantenna receiver. The processing circuitry may be arranged to determine the radio channel by performing spatial signal processing on the signal obtained from the multiantenna receiver.

The processing circuitry may be arranged to determine antenna power variance, and to compare the determined antenna power variance to an antenna power variance typical of LOS or NLOS signals. Additionally or alternatively, the processing circuitry may be arranged to determine an angular power spectrum, and to compare the determined angular power spectrum to an angular power spectrum typical of LOS or NLOS signals.

The processing circuitry may be arranged to determine the radio channel by identifying fading characteristics of the signal and comparing the fading characteristics to known fading characteristics of LOS and/or NLOS signals.

The processing circuitry may be arranged to determine that the radio channel is more likely to be an NLOS channel than an LOS channel in response to a depth of a fade meeting a predetermined threshold, and to determine that the radio channel is more likely to be an LOS channel than an NLOS channel in response to a depth of a fade not meeting the predetermined threshold.

The processing circuitry may be arranged to determine that the radio channel is more likely to be an NLOS channel than an LOS channel in response to identifying Rayleigh-type fading characteristics in the signal.

The processing circuitry may be arranged to determine that the radio channel is more likely to be an LOS channel than an NLOS channel in response to identifying Rice-type fading characteristics in the signal.

The processing circuitry may be arranged to determine the radio channel by determining an angular power spectrum of the signal and comparing the angular power spectrum to known angular power spectrums of LOS and/or NLOS signals.

The processing circuitry may be arranged to calculate a ratio of the values of the highest peak to the second highest peak in the angular power spectrum of the signal, and to compare the ratio to a predetermined threshold.

The processing circuitry may be arranged to determine that the radio channel is more likely to be an LOS channel than an NLOS channel in response to the ratio meeting the predetermined threshold.

The processing circuitry may be arranged to determine that the radio channel is more likely to be an NLOS channel than an LOS channel in response to the ratio not meeting the predetermined threshold.

The processing circuitry may be arranged to determine the radio channel by determining a power delay profile of the signal and comparing the profile to known power delay profiles of LOS and/or NLOS signals.

The processing circuitry may be arranged to compare the power level of a first tap to the power levels of other taps in the power delay profile.

The processing circuitry may be arranged to determine that the radio channel is more likely to be an LOS channel than an NLOS channel in response to the first tap having the highest power level.

The processing circuitry may be arranged to determine that the radio channel is more likely to be an NLOS channel than an LOS channel in response to the first tap not having the highest power level.

The processing circuitry may be arranged to compare the fading characteristics of the first tap to the known fading characteristics of LOS and/or NLOS signals.

The processing circuitry may be arranged to determine that the radio channel is more likely to be an NLOS channel than an LOS channel in response to a depth of a fade meeting a predetermined threshold, and to determine that the radio channel is more likely to be an LOS channel than an NLOS channel in response to a depth of a fade not meeting the predetermined threshold.

The processing circuitry may be arranged to determine that the radio channel is more likely to be an NLOS channel than an LOS channel in response to identifying Rayleigh-type fading characteristics in the first tap.

The processing circuitry may be arranged to determine that the radio channel is more likely to be an LOS channel than an NLOS channel in response to identifying Rice-type fading characteristics in the first tap.

The processing circuitry may be arranged to determine the radio channel by determining a Doppler spectrum of the signal and comparing the Doppler spectrum to known Doppler spectrums of LOS and/or NLOS signals.

The processing circuitry may be arranged to determine that the radio channel is more likely to be an LOS channel than an NLOS channel in response to detecting a dominant peak in the Doppler spectrum.

The processing circuitry may be arranged to determine that the radio channel is more likely to be an NLOS channel than an LOS channel in response to detecting the absence of a dominant peak in the Doppler spectrum.

According to a third aspect of the invention, there is provided a method comprising
  the step of obtaining a signal from a receiver;
  the step of determining whether the signal more likely propagated through a line-of-sight (LOS) radio channel or a non-line-of-sight (NLOS) radio channel;
  the step of using a model including parameters selected according to the radio channel to estimate the distance between the receiver and a transmitter which sent the signal.

According to a fourth aspect of the invention, there is provided an apparatus comprising
  means for obtaining a signal;
  means for determining whether the signal more likely propagated through a line-of-sight (LOS) radio channel or a non-line-of-sight (NLOS) radio channel;
  means for using a model including parameters selected according to the radio channel to estimate the distance between the receiver and a transmitter which sent the signal.

According to a fifth aspect of the invention, there is provided a computer program comprising code portions arranged to perform the method of the first aspect.

According to a sixth aspect of the invention, there is provided a computer program comprising
  a code portion for obtaining a signal;
  a code portion for determining whether the signal more likely propagated through a line-of-sight (LOS) environment or a non-line-of-sight (NLOS) radio channel;
  a code portion for using a model including parameters selected according to the radio channel to estimate the distance between the receiver and a transmitter which sent the signal.

The computer code may be recorded on a carrier, including read and/or read/write memory.

According to a seventh aspect, there is provided a computer program comprising program code means adapted to perform any of the steps of the first or third aspects when the program is run on a processor.

According to an eighth aspect, there is provided a computer program product comprising program code means stored in a computer-readable medium, the program code means being adapted to perform any of the steps of the first or third aspects when the program is run on a processor.

Any aspect of the invention may be used in conjunction with a multiantenna receiver.

Any circuitry may include one or more processors, memories and bus lines. One or more of the circuitries described may share circuitry elements.

The present invention includes one or more aspects, embodiments or features in isolation or in various combinations whether or not specifically stated (including claimed) in that combination or in isolation.

BRIEF DESCRIPTION OF THE DRAWINGS

A description is now given, by way of example only, with reference to the accompanying drawings, in which:—

DETAILED DESCRIPTION

Figure 1:
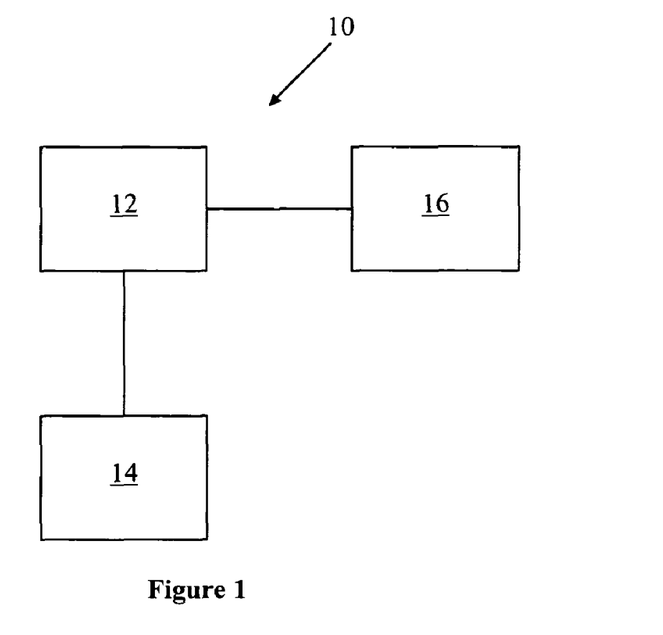
FIG. 1 shows distance-estimation apparatus.

FIG. 1 shows distance-estimation apparatus 10 including a receiver 12 and processing circuitry 14. The receiver 12 is connected to an antenna 16. In use, the processing circuitry 14 measures the received power of a signal, and removes the fast fading by averaging. The processing circuitry 14 detects features of the signal to obtain information on propagation conditions. In particular, the processing circuitry 14 operates to determine from the detected features whether or not it is likely that there is a line-of-sight between a transmitter (not shown) which sent the signal and the receiver 12. Using that information, the processing circuitry 14 selects an appropriate pathloss model to estimate the distance of the transmitter using the received power.

Line-of-sight (LOS) and non line-of-sight (NLOS) signals differ from each other in many ways. In LOS cases, there exists a direct path from the transmitter to the receiver. In NLOS cases, most signal energy is usually coming though reflections, diffraction and scattering from objects in the vicinity. The direct path in NLOS cases penetrates buildings or other obstacles, and is thus attenuated. This fundamental difference can be seen in the properties of the received signal.

By obtaining information on the radio propagation channel and using that for the selection of a proper pathloss model for each of the LOS and NLOS cases, the error caused by propagation distortion is minimised. Different values for the constants $\gamma$ and $PL_0$ in the pathloss calculation $$PL = -10 \cdot \gamma \cdot \log_{10}(r) + PL_0 \qquad (1)$$

can be used depending on the radio channel, thereby improving the distance-estimation accuracy.

Inspecting the properties of the received signals from the antenna elements of the multiantenna 16 reveals information on the radio propagation channel, as will be described.

Multipath radio propagation results in the spreading of signal power in time (delay) and space (angle) dimensions, Moreover, movement of the transmitter or receiver 12 causes spreading in the frequency dimension. Spreading in the delay dimension can be utilised to detect the presence of a dominant signal component, caused by a direct line-of-sight (LOS) propagation path. However, signal spreading in the delay dimension can only be observed if the transmitted signal has a wide bandwidth, which is not the case in systems based on Bluetooth or Wibree, for example. Additionally, observing the signal spreading in frequency dimension requires that one or more of the transmitter, the receiver or scattering objects in the environment are moving.

Inspecting the received signal in spatial (or angular) dimension reveals information about the spatial coherence of the radio channel. The processing circuitry 14 is arranged to utilise the information of signals from the multiantenna 16 in spatial signal processing methods, which include the use of one or more of antenna power variance and an angular power spectrum.

The received power information from the antenna elements of the multiantenna 16 can be averaged to obtain a more reliable estimate of the received power and thus the distance. This relates to the fact that signal fading due to multipath propagation is different in the multiple antenna elements.

One method of determining whether the signal more likely propagated through an LOS radio channel or an NLOS radio channel involves the use of fading statistics. Fading in an LOS channel is Rice-distributed, whereas fading in an NLOS channel is Rayleigh-distributed. Rayleigh-distributed fading involves deeper fading dips, because of the absence of a direct component. This difference is used by the apparatus 10 as a distinguishing criterion. The processing circuitry 14 is arranged to calculate an average value of the fading dips and to compare the average value with a predetermined threshold. The processing circuitry 14 is arranged to determine that the radio channel is more likely an NLOS channel in response to the average value meeting the predetermined threshold (i.e. deeper fading dips), and to determine that the radio channel is more likely an LOS channel in response to the average value not meeting the predetermined threshold (i.e. shallower fading dips). The depth of the fade can be calculated as the received power when the signal is fading versus the average received power. Fading can be observed both in time and space dimensions. If one or more of the transmitter, the receiver or scattering objects in the environment moves, the received signal strength measured at the output of each antenna element varies depending on the radio channel as a function of time. In a time-invariant case, the fading is observed by comparing the powers received by the antenna elements (assuming that the radiation patterns of the antenna elements are identical). This information may be used, as explained below, in conjunction with the APS, and/or by comparing the variance of the signal power/amplitude between antenna elements to a threshold. Smaller variance indicates a probable LOS radio channel (assuming identical radiation patterns).

Figure 2:
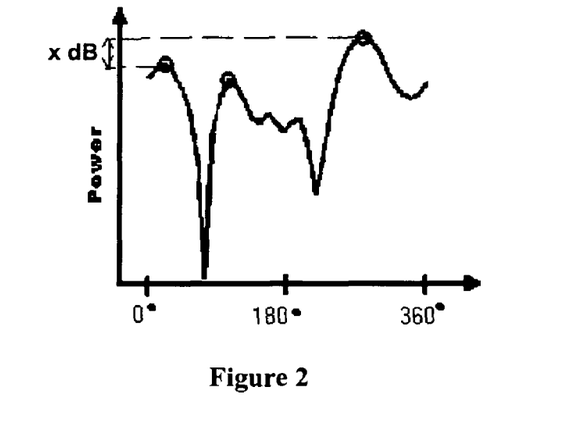
FIG. 2 shows an example of an angular power spectrum (APS) of an incoming signal and the power difference of two peaks in the APS.

Another method of determining whether the signal more likely propagated through an LOS radio channel or an NLOS radio channel involves the use of an annular power spectrum (APS), an example of which is shown in FIG. 2. The processing circuitry 14 is arranged to determine of the APS of the received signal. The processing circuitry 14 may use the APS for direction tracking purposes in addition to distance estimation. The processing circuitry 14 is arranged to search local maxima of the APS. In an LOS channel, the signal power is mainly coming from the direction of the transmitter, resulting in a high peak in the APS. If there is no direct signal component present (i.e. the channel is an NLOS channel), the power is probably distributed more evenly in the angular domain. This means that in an LOS radio channel the ratio between the highest and the second highest peak in the APS, or the height of the strongest peak versus total (or average) power, is bigger than in an NLOS radio channel. The processing circuitry 14 is arranged to compare the ratio between the highest and second highest peak in the APS with a predetermined threshold. The processing circuitry 14 is arranged to determine that the radio channel is more likely an LOS radio channel in response to the ratio meeting the predetermined threshold, and to determine that the radio channel is more likely an NLOS radio channel in response to the ratio not meeting the predetermined threshold.

A further method of determining whether the signal more likely propagated through an LOS radio channel or an NLOS radio channel involves the use of the variation of the total signal power. Signals suffer from fading due to multipath propagation, and this fading is most severe when there is no dominant signal component, such as in NLOS cases. In NLOS cases, the fades can be easily 10 dB or more deep compared to average signal strength, whereas in LOS cases the power variance is typically only a couple of decibels. Observing the fading statistics gives information of the channel conditions.

A further method of determining whether the signal more likely propagated through an LOS radio channel or an NLOS radio channel involves the use of the power of the first tap compared to other taps. In the case that the transmitted signal has a wide bandwidth, the receiver 12 may have a channel estimation block (not shown) capable of estimating the channel delay dispersion, i.e. the power delay profile (PDP) of the channel. In LOS cases, the averaged power delay profile has the highest peak at the beginning, i.e. the LOS component is always stronger than any of the multipaths that arrive to the receiver 12 via reflections or diffractions from obstacles.

A further method of determining whether the signal more likely propagated through an LOS radio channel or an NLOS radio channel involves the use of the variation of the power in the first tap. If the shape of the power delay profile alone is not a reliable indicator, combining it with power variation measurements improves accuracy. I.e. observing the fading statistics of the first tap in the power delay profile gives an indication of the radio channel. The fading-based method described above may be used.

A further method of determining whether the signal more likely propagated through an LOS radio channel or an NLOS radio channel involves the use of the shape of a Doppler spectrum. In the case that LOS exists between transmitter and receiver, there is one dominant peak in the Doppler spectrum of the received signal, which can be computed by the processing circuitry 14. The dominant peak also has a relatively constant Doppler frequency shift when observed over a relatively short period of time. Thus, by calculating the Doppler spectrum of the total signal and/or first tap and/or highest APS peak, and comparing the frequency variations to a threshold, LOS and NLOS radio channels can be distinguished. Variations which meet the threshold indicate a probable NLOS radio channel, whereas those which do not meet the threshold indicate a probable LOS radio channel.

A further method of determining whether the signal more likely propagated through an LOS radio channel or an NLOS radio channel involves the use of the power variations in the strongest peak in the APS. The method based on variation in the power of the first tap could be applied in the angular domain. This method involves observing the depth of the fades of the highest peak (i.e. how much the power of the highest peak varies as a function of time), and compare the depth to a threshold. The processing circuitry 14 is arranged to calculate an average value of the fading dips and to compare the average value with a predetermined threshold. The processing circuitry 14 is arranged to determine that the radio channel is more likely an NLOS radio channel in response to the average value meeting the predetermined threshold (i.e. deeper fades), and to determine that the radio channel is more likely an LOS radio channel in response to the average value not meeting the predetermined threshold (i.e. shallower fades). The depth of the fade can be calculated as the received power when the signal is fading versus the average received power. This method is especially useful when power variation in the delay domain is difficult to calculate due to narrow bandwidth.

It is also envisaged that any other method which uses differences in signal characteristics to distinguish between LOS and NLOS cases is within the scope of the invention.

The processing circuitry 14 is arranged to combine any two or more methods in order to improve reliability. When deciding which method(s) to use, the decision can be made separately for each system, taking into account the following, for example:

1. In a narrowband system, the delay taps cannot easily be separated, and so looking at the first tap and its power variations is not ideal.
2. If the system is static, the fading-based methods may not be useful. By "static" is meant that there is no movement at all.
3. A multiantenna receiver is needed for the APS-based methods. The spatial resolution of the receiver determines the utility of the APS-based methods.
4. The Doppler-based methods are most useful when there is movement (of the receiver/transmitter/environment). If it's probable that there is no movement, or the velocity is not large enough, the Doppler-based methods may not be useful.

Figure 4:
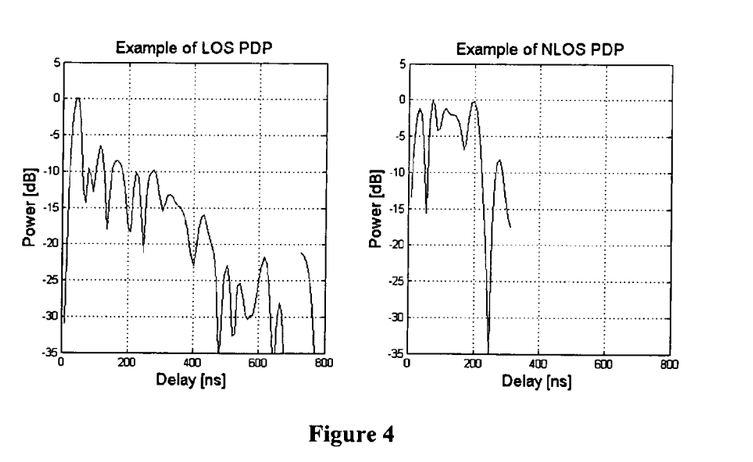
FIG. 4 shows examples of power delay profiles (PDPs) measured in LOS and NLOS radio channels.

FIG. 4 shows examples of power delay profiles (PDPs) of measured LOS and NLOS radio channels. It can be seen that the shape of the PDP is different in these two cases. In the LOS case, the first tap of the PDP is highest and after that the PDP typically follows exponential decay in time. In the NLOS case, the first component is not necessarily the strongest and the shape of the PDP is more random. Exponential decay can also be seen in the NLOS case.

Figure 5:
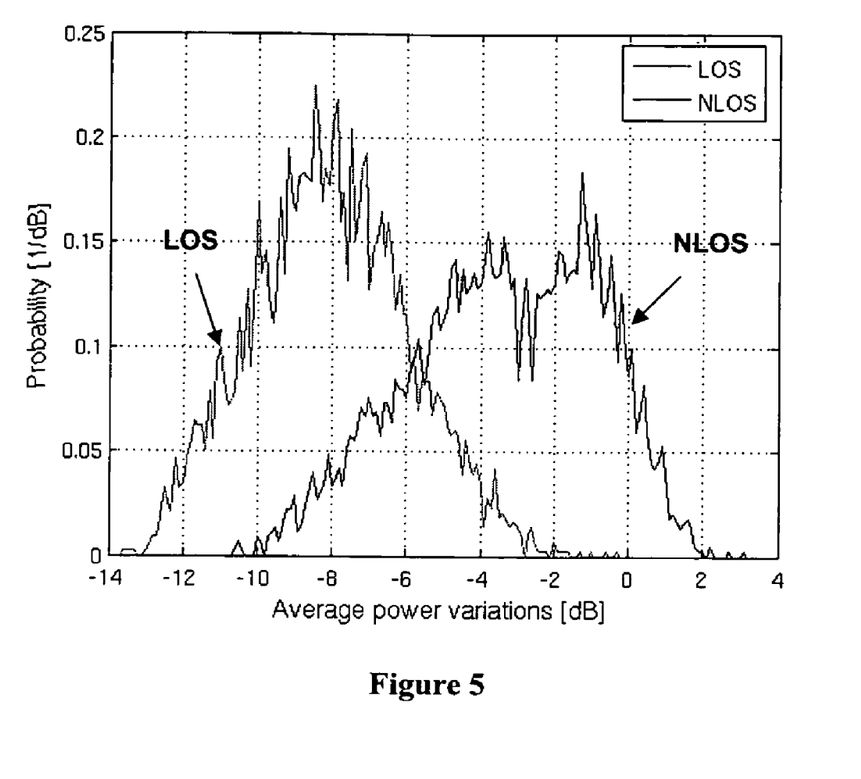
FIG. 5 shows the average magnitude of power variations of a first tap compared to an average power.

FIG. 5 shows the average magnitude of power variations of the first tap compared to the average power for examples of both LOS and NLOS cases.

The fist delay tap was tracked during 0.2 seconds (the speed of the measurement vehicle was about 5 m/s, i.e. this corresponds to about 1 meter). The variations in the instantaneous power of the first tap were monitored. First, the power of the tap was normalized, to have equal power in LOS and NLOS cases. The average of absolute power variations was calculated for each 0.2 seconds period.

In the exemplary LOS case, the magnitude of power variations of the first tap are in the order of −10 to −6 dB, compared to the average signal level, whereas, in the exemplary NLOS case, the variations are typically much bigger. It should be understood that the values in FIG. 5 are provided as an example and that the invention is not limited to such values. The values depend on bandwidth, for example, and may be determined for each system separately. In this case, however, −6 dB serves as a good threshold value.

As can be seen in FIG. 5, the distributions are partly overlapping. If the magnitude of variations is below −6 dB (which is approximately the point at which the curves cross), the probability of the radio channel being an LOS case is about 80% (assuming that the LOS and NLOS cases are equally probable without this extra information). If the magnitude of variations is higher than −6 dB, the probability of the radio channel being an NLOS case is about 86%. Combining this information with one or more of the other methods described herein results in higher detection reliability.

The situation shown in FIG. 5 serves as an example of how a threshold value can be set in order to discriminate between NLOS and LOS cases. It will be apparent that the skilled person will understand how to apply this example to the other detection methods described herein.

After determining whether the received signal more likely propagated through an LOS channel or an NLOS channel, the processing circuitry 14 selects model parameters to describe the pathloss in that particular radio propagation channel. The parameters are selected simply for either an LOS or an NLOS radio channel. The equation (1) has two parameters. If the environment is known (e.g. urban outdoor), the parameter $\gamma$ can be obtained from pathloss models. The parameter $PL_0$ can be set during the design phase of the device, because it depends on antenna gains etc. It is usual for some kind of calibration or parameter setting to be required in the design phase.

In addition, the processing circuitry 14 uses the average received power of the antenna elements to estimate the distance using the appropriate model.

Since the received power depends on transmitted power and antenna gains in addition to distance, the transmitted power and antenna gains need to be known at the receiver to cancel out their effects. The effects can be cancelled by doing one or more calibration measurements at known distance(s). The transmitter may communicate this information to the receiver 12 using the same radio connection as is used for estimating the distance.

In a line-of-sight (LOS) case, the accuracy of the distance estimate is good, because there are no objects between the receiver and transmitter, and thus the model of equation (1) is more accurate. In a non-line-of-sight (NLOS) case, the accuracy is not as good as the LOS case, but is better than treating LOS and NLOS cases identically, as is done in the prior art.

Figure 3:
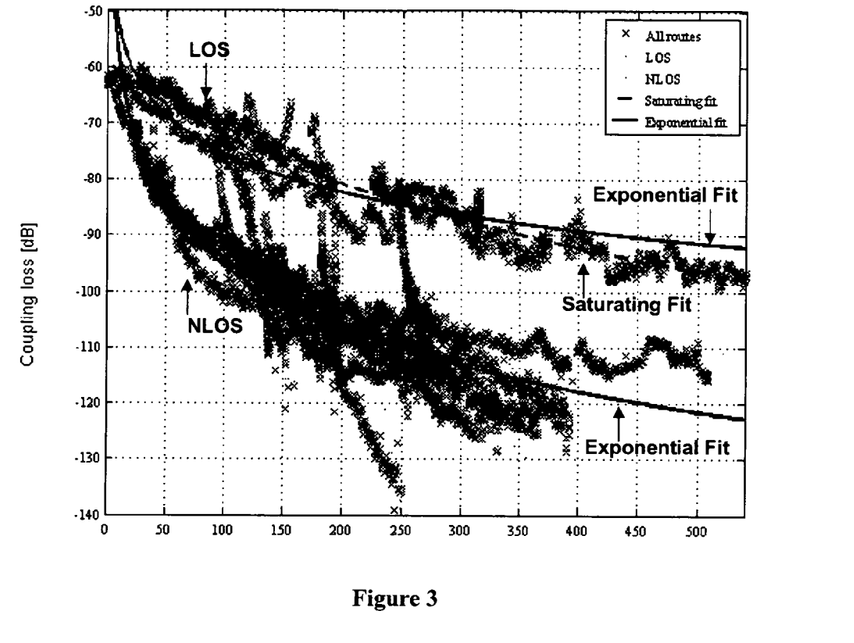
FIG. 3 shows pathloss as a function of the distance between a mobile and a base station, calculated along the streets in a microcellular Manhattan grid environment.

FIG. 3 shows pathloss as a function of the distance between a mobile terminal and a base station and provides an example of the distance-power dependency. The measurements were made at a carrier frequency of 2.4 GHz in a microcellular environment (i.e. in which the base station is below rooftop level) in downtown Helsinki. The pathloss was calculated after filtering away the power variations caused by fast fading. In FIG. 3, the upper curve represents LOS and the lower curve NLOS.

One possible pathloss model is $$PL = -10 \cdot \gamma \cdot \log_{10}(r) + PL_0 \qquad (1)$$

where PL is the pathloss, r is the distance between receiver and transmitter, $\gamma$ is a pathloss exponent, and $PL_0$ is the pathloss at a fixed distance, e.g. 1 meter. Thus, if the pathloss PL is known, the distance r can be calculated. It is to be understood that the invention is not limited to this particular model, and that any appropriate model may be used.

As seen in FIG. 3, the pathloss clearly depends on distance, but there is a significant difference between the LOS and NLOS cases. For example, if the pathloss is 90 dB, the distance estimate is about 430 m for the LOS case and only about 70 m for the NLOS case.

Thus, by discriminating between LOS and NLOS cases, the distance estimation accuracy is improved significantly over prior art methods.

In one embodiment, equation (1) is applied in both LOS and NLOS cases, but with different values for the constants $\gamma$ and $PL_0$.

Possible applications of the method include
1. Tracking devices
2. Global Positioning System (GPS). Multipaths are a problem in GPS systems, because reflected paths are longer than direct ones, and thus the time of arrival may be incorrect.
3. Initial synchronisation or handover phase of a future communication system where a mobile terminal may use its approximate distance from a base station for correct timing of its transmission.

In a variant, one of the antenna elements of the multiantenna may be ignored if it has too low or too high power.

Figure 6:
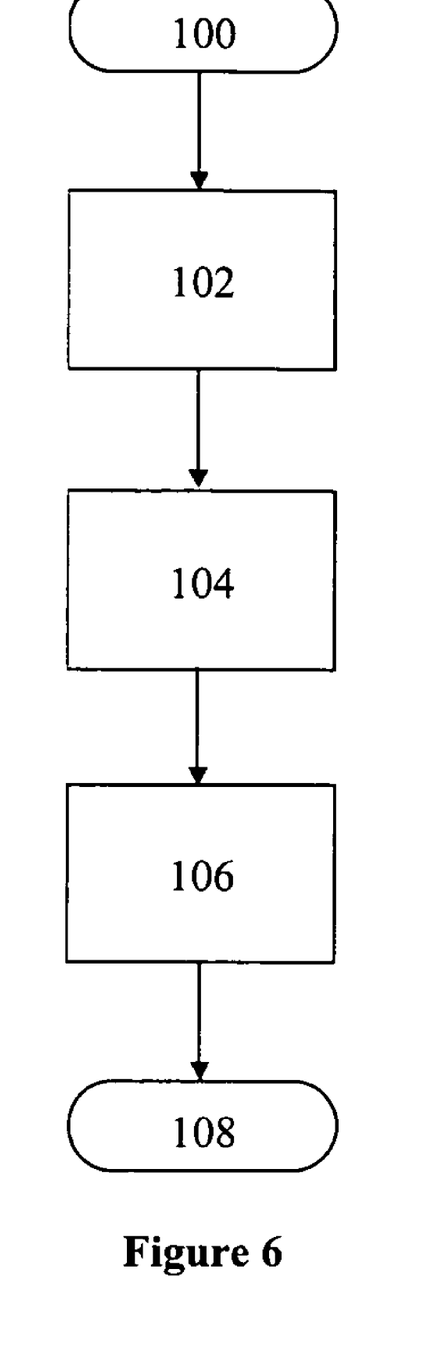
FIG. 6 is a flowchart representing a method.

FIG. 6 is a flowchart representing a method. The method begins at 100 and ends at 108. Step 102 comprises obtaining a signal from a receiver. Step 104 comprises determining whether the signal more likely propagated through a line-of-sight (LOS) radio channel or a non-line-of-sight (NLOS) radio channel. Step 106 comprises using a model including parameters selected according to the radio channel to estimate the distance between the receiver and a transmitter which sent the signal. The method may include any other steps described or claimed in this specification.

It will be appreciated that the aforementioned circuitry may have other functions in addition to the mentioned functions, and that the same circuit may perform these functions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognised that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
    obtaining a signal from antenna elements of a multi-antenna receiver; and
    determining whether the signal is more likely associated with propagation from a transmitter via a line-of-sight (LOS) radio channel or a non-line-of-sight (NLOS) radio channel by performing one or more selected from the group comprising:
        (1) determining the angular power spectrum of the signal and comparing the angular power spectrum of the signal with known angular power spectrums of LOS and/or NLOS signals; and
        (2) determining the power variance of the signal and comparing the power variance of the signal with known power variance values of LOS and/or NLOS signals;
    wherein the method further comprises:
        using a model including parameters selected according to whether the signal is more likely associated with an LOS or an NLOS radio channel to estimate the distance between the receiver and the transmitter.

2. A computer program product comprising program code means stored in a non-transitory computer-readable medium, the program code means being adapted to perform the steps of claim 1 when the program is run on a processor.

3. An apparatus comprising
    a receiver configured to obtain a signal from antenna elements of a multi-antenna receiver;
    processing circuitry configured to:
        determine whether the signal is more likely associated with propagation from a transmitter via a line-of-sight (LOS) radio channel or a non-line-of-sight (NLOS) radio channel by being configured to perform one or more selected from the group comprising:
            (1) determine the angular power spectrum of the signal and compare the angular power spectrum of the signal with known angular power spectrums of LOS and/or NLOS signals; and
            (2) determine the power variance of the signal and compare the power variance of the signal with known power variance values of LOS and/or NLOS signals;
    wherein the processing circuitry is further configured to:
        use a model including parameters selected according to whether the signal is more likely associated with an LOS or an NLOS radio channel to estimate the distance between the receiver and the transmitter.

4. The apparatus according to claim 3, wherein the processing circuitry is further configured to determine the radio channel by identifying characteristics of the received signal and comparing the identified characteristics to characteristics typical of LOS or NLOS signal in order to determine whether the signal is more likely associated with propagation from the transmitter via a line-of-sight (LOS) radio channel or a non-line-of-sight (NLOS) radio channel to determine the radio channel between the transmitter and the receiver.

5. The apparatus according to claim 4, wherein the characteristics include any one or more of fading characteristics, power delay profile, Doppler spectrum characteristics.

6. The apparatus according to claim 3, wherein the processing circuitry is configured to determine the radio channel by performing spatial signal processing on the signal obtained from the multi-antenna receiver.

7. The apparatus according to claim 3, wherein the processing circuitry is configured to determine the radio channel by identifying fading characteristics of the signal and comparing the fading characteristics to known fading characteristics of LOS and/or NLOS signals.

8. The apparatus according to claim 7, wherein the processing circuitry is configured to determine that the radio channel is more likely to be an NLOS channel than an LOS channel in response to a depth of a fade meeting a predetermined threshold, and to determine that the radio channel is more likely to be an LOS channel than an NLOS channel in response to a depth of a fade not meeting the predetermined threshold.

9. The apparatus according to claim 7, wherein the processing circuitry is configured to:
determine that the radio channel is more likely to be an NLOS channel than an LOS channel in response to identifying Rayleigh-type fading characteristics in the signal; and
determine that the radio channel is more likely to be an LOS channel than an NLOS channel in response to identifying Rice-type fading characteristics in the signal.

10. The apparatus according to claim 3, wherein the processing circuitry is configured to determine the angular power spectrum of the received signal and compare the angular power spectrum of the received signal with typical angular power spectrums of LOS and/or NLOS signals by:
calculating a ratio of the values of the highest intensity peak to the second highest intensity peak in the angular power spectrum of the signal;
comparing the ratio to a predetermined threshold; and
determining that the radio channel is more likely to be an LOS channel than an NLOS channel in response to the ratio meeting the predetermined threshold; and
determining that the radio channel is more likely to be an NLOS channel than an LOS channel in response to the ratio not meeting the predetermined threshold.

11. The apparatus according to claim 3, wherein the processing circuitry is configured to determine the radio channel by determining a power delay profile of the signal and comparing the profile to known power delay profiles of LOS and/or NLOS signals.

12. The apparatus according to claim 11, wherein the processing circuitry is configured:
to compare the power level of a first tap to the power levels of one or more other taps in the power delay profile;
to determine that the radio channel is more likely to be an LOS channel than an NLOS channel in response to the first tap having the highest power level; and
to determine that the radio channel is more likely to be an NLOS channel than an LOS channel in response to the first tap not having the highest power level.

13. The apparatus according to claim 11, wherein the processing circuitry is configured:
to compare the fading characteristics of a first tap to the known fading characteristics of LOS and/or NLOS signal;
to determine that the radio channel is more likely to be an NLOS channel than an LOS channel in response to identifying Rayleigh-type fading characteristics in the first tap; and
to determine that the radio channel is more likely to be an LOS channel than an NLOS channel in response to identifying Rice-type fading characteristics in the first tap.

14. The apparatus according to claim 3, wherein the processing circuitry is arranged to:
determine Doppler spectrum of the signal; and
compare the Doppler spectrum to known Doppler spectrums of LOS and/or NLOS signal in order to determine whether the received signal is more likely associated with propagation from the transmitter via a line-of-sight (LOS) radio channel or a non-line-of-sight (NLOS) radio channel.

15. The apparatus according to claim 14, wherein the processing circuitry is configured to:
determine that the radio channel is more likely to be an LOS channel than an NLOS channel in response to detecting a dominant peak in the Doppler spectrum; and
determine that the radio channel is more likely to be an NLOS channel than an LOS channel in response to detecting the absence of a dominant peak in the Doppler spectrum.

16. The apparatus according to claim 3, wherein the processing circuitry is further configured to select an appropriate pathloss model as the model to estimate the distance between the receiver and the transmitter.

17. The apparatus according to claim 16, wherein the processing circuitry is configured to use the following pathloss model to estimate the distance between the receiver and the transmitter:

$$PL = -10 \cdot \gamma \cdot \log_{10}(r) + PL_0$$

where:
PL represents pathloss;
r represents the distance between the transmitter and the receiver;
$\gamma$ represents a pathloss exponent; and
$PL_0$ represents the pathloss at a given distance.

18. The apparatus according to claim 17, wherein the processing circuitry is configured to select different values for the constants $\gamma$ and $PL_0$ in accordance with the determined radio channel.

19. The apparatus according to claim 17, wherein the processing circuitry is configured to use an average value of the signal for the PL parameter.

20. The apparatus according to claim 3, wherein the processing circuitry is configured to determine whether the signal is more likely associated with propagation from the transmitter via a line-of-sight (LOS) radio channel or a non-line-of-sight (NLOS) radio channel by averaging the determined angular power spectrum and/or determined power variance.

* * * * *